Oct. 20, 1942.  A. E. KARLBERG  2,299,395

SHAFT SEAL

Filed Oct. 18, 1941

Inventor
Arvid E. Karlberg
By

Patented Oct. 20, 1942

2,299,395

UNITED STATES PATENT OFFICE 2,299,395

SHAFT SEAL

Arvid E. Karlberg, Chicago, Ill., assignor to Chicago Seal Company, Chicago, Ill., a corporation of Illinois

REISSUED

Application October 18, 1941, Serial No. 415,592

JUL 27 1943

4 Claims. (Cl. 286—7)

This invention relates to seals for shafts, particularly adapted, though not necessarily limited in its use, for sealing compressor shafts which project through a wall of the compressor casing, to prevent escape or leakage of oil and gas.

Heretofore, with seals of this character, there has been provided a bellows constructed of metal, which encompasses the shaft, and this bellows has running engagement with a metal element at both ends. The bellows being connected at one end to the shaft, will expand and contract not only under torsional stresses, but also by reason of any longitudinal movement of the shaft. Such expansion and contraction of the bellows is detrimental to a sealing organization, as the continuous flexing causes the material to crystallize and break.

It is one of the objects of the present invention to overcome these difficulties and objections, and to provide an improved shaft seal of this character, in which the bellows is dispensed with, and, at the same time, to provide an improved structure whereby an effective and efficient seal will be provided, and there will be provided sealing elements at one end of the sleeve, which latter encompasses the shaft, and a seal at the other end of the sleeve which will permit the sleeve not only to rotate with respect to the casing wall, but will also permit it to move longitudinally with respect to and through the casing wall, at the same time maintaining a perfect seal.

A further object is to provide in a seal of this character, improved means at both ends of the sleeve to permit of sufficient flexibility to provide for adjustment of the shaft when normally out of line, the sleeve being free from rigid anchorage at both ends thereof.

A further object is to provide in a sealing organization of this character, improved sealing means at one end of the sleeve which will permit of rotation with respect to the casing wall, and longitudinal movement therethrough, in association with a resilient sealing element, the sealing action of which latter is increased under the action of the longitudinal movement of the sleeve.

To the attainment of these ends and the accomplishment of other new and useful objects as will appear, the invention consists in the features of novelty in substantially the construction, combination and arrangement of the several parts hereinafter more fully described and claimed, and shown in the accompanying drawing illustrating this invention, in which:

Figure 1:
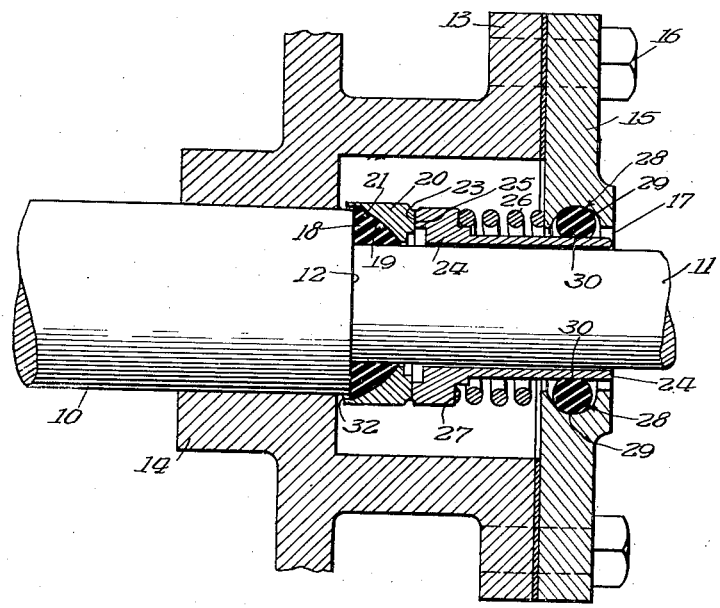
Figure 1 is a view, partly in elevation and partly in vertical section, of a structure embodying this invention.
Figure 2:
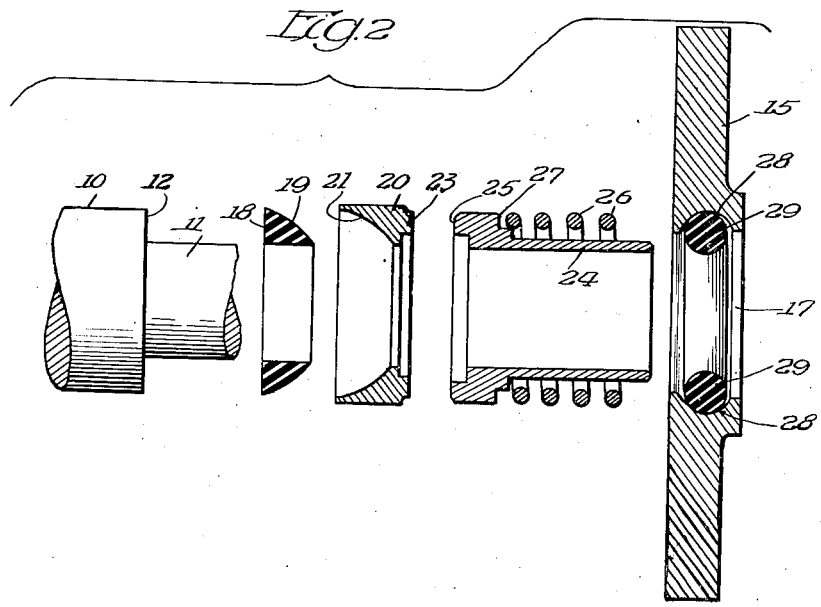
Figure 2 is an exploded view of the parts of the sealing organization.
Figure 2:

Referring more particularly to the drawing, the numeral 10 designates a portion of a driven shaft which is to be sealed, and this shaft is provided with a reduced portion 11, to form a shoulder 12.

The numeral 13 designates generally a portion of a compressor housing having a bearing 14 connected thereto, in which the shaft 10 rotates.

A front plate 15 is secured to the housing wall 13, preferably by means of screws or bolts 16, and this plate is provided with an opening 17 therethrough, through which the reduced portion 11 of the shaft 10 passes. This opening 17 is of a diameter considerably greater than the external diameter of the portion 11 of the shaft.

Encompassing the portion 11 of the shaft and abutting the shoulder 12, is a resilient sealing element 18, the outer surface 19 of which is convex.

A bearing element 20 encompasses the portion 11 of the shaft and is provided with a concave recessed face 21, to receive the convex face 19 of the element 18. A portion of the bearing element 20 preferably extends over the shoulder 12 as at 32, so as to prevent a portion of the element 18 from being forced between the extremity of the element 20 and the shoulder 12, in the event of excessive compression of the element 18.

The bearing element 20 has an outer flat bearing surface 23. A non-rotatable sleeve 24 encompasses the portion 11, and is provided with a bearing surface 25 which contacts the surface 23 of the element 20, and a spring 26 encompassing the sleeve rests against a shoulder 27 thereon at one end, while the other end of the spring 26 preferably contacts the inner surface of the plate 15, and tends normally to maintain the bearing faces 23 and 25 in contact, as well as the surfaces 19 and 21 of the elements 18 and 20.

With this construction, the sleeve 24 will have a running contact against the bearing element 20; the bearing element 20, in turn, having contact with the resilient element 18, will permit of a rocking movement of the shaft 10—11 while maintaining an effective seal.

Within the wall of the opening 17 in the plate 15, and encompassing the opening and disposed within the planes of the inner and outer faces of the plate 15, is an open recess or groove 28.

The sleeve 24 projects into the opening 17 and is of a length to normally project beyond the recess or groove 28 in the plate 15. Within the recess 28 and encompassing the sleeve 24 is disposed a resilient packing element 29, the body of which is preferably of a circular cross-sectional configuration, and the element is annular in configuration, and through which element 29 the sleeve passes. The internal diameter of the annular element 29 is less than the external diameter of the portion of the sleeve 24 that passes therethrough, so that the body of the element 29 will be distorted or flattened as at 30, to form a tight seal and, at the same time, permit the sleeve to slide therethrough.

The groove or channel 28 is of a semi-circular configuration in cross-section, and the length of the opening is only slightly greater than the cross-sectional diameter of the body of the element 29, so that when the sleeve 24 is moved with respect to the casing wall of the plate 15 to be projected through the opening 17, the sleeve will not only slide through the element 29, but the element 29 will be given a rolling movement. By reason of the configuration of the groove or channel 28, the instant that the element 29 is given such a rolling movement, it will be further compressed and the sealing qualities thereof will be immediately increased.

With this construction, it will be manifest that the sealing organization is free from rigid anchorage at both ends. By reason of the frictional engagement of the bearing element 20 with the resilient element 18, the element 20 will be caused to rotate with the shaft and, at the same time, it will be adapted for relative rotary movement with respect to the shaft, thereby overcoming excessive torsional stresses.

The sleeve 24 will be resiliently held against rotation by means of the sealing element 29, and as the bearing element 20 rotates, its face 21 will have running contact with the face 25 of the sleeve 24.

The spring 26 operates, at all times, to hold the end of the sleeve 24 in contact with the bearing element 20. Under excessive rotative stresses, the sleeve 24 is adapted to rotate within the element 29, and in the event that there is any longitudinal movement of the shaft 10 and 11, for any reason, the spring 26 will yield and the sleeve 24 will slide freely through the packing element 29 and the opening 17 in the plate 15. At the same time, a perfect seal will be maintained between the sealing element 29 and the sleeve 24 and the wall of the opening 17 in the plate 15.

The opening 17 is of sufficient diameter to permit of a rocking movement of the shaft 11, whereby the shaft may be adjusted when it is out of alinement, and the convex and concave bearing surfaces 19 and 21 between the elements 18 and 20 will permit of such rocking movement.

While the preferred form of the invention has been herein shown and described, it is to be understood that various changes may be made in the details of construction and in the combination and arrangement of the several parts, within the scope of the claims, without departing from the spirit of this invention.

What is claimed as new is:

1. In combination with a sealing organization, a casing embodying a chamber and a wall forming a closure for the chamber, the faces of said wall being substantially parallel throughout substantially their areas, there being an opening in said wall in alinement with said chamber, a shaft passing through said opening and of a diameter considerably less than the diameter of said opening, a non-rotatable sleeve of substantial length encompassing the shaft, one end of the sleeve extending into and adapted to pass through said opening, there being an annular recess in the wall of said opening, disposed entirely within the confines of the said faces of said wall, a resilient element seated in said recess and itself being disposed and maintained, at all times, within the planes of the faces of said wall, and outside of said chamber, said resilient element being compressed and also maintained under pressure solely by and between the bottom of said recess and said sleeve, a resilient sealing element spaced from the wall of the casing and abutting a shoulder on said shaft, a bearing element abutting the last said resilient element, and with which bearing element one end of the sleeve has running engagement, and resilient means interposed between said wall and a shoulder on said sleeve for maintaining the said end of the sleeve in contact with said bearing element.

2. In combination with a sealing organization, a casing having an opening in its wall, a shaft passing through said opening and of a diameter considerably less than the diameter of said opening, a non-rotatable sleeve of substantial length encompassing the said shaft, one end of the sleeve extending into and adapted to pass through said opening, a resilient sealing annular member positioned between said sleeve and the wall of said opening, and disposed within the plane of the faces of said wall, said element being seated in a recess in said opening in the wall and compressed between the bottom of said recess and said sleeve, a resilient sealing element spaced from the wall of the casing and abutting a shoulder on said shaft, a bearing element abutting the last said resilient element, and with which bearing element one end of the sleeve has running engagement, and resilient means for maintaining the said end of the sleeve in contact with said bearing element, the abutting faces of said bearing element and the second recited sealing element being provided one with a convex surface and the other with a concave surface to receive the convex surface, to provide a rocking movement one with respect to the other.

3. In combination with a sealing organization, a casing having an opening in its wall, a shaft passing through said opening and of a diameter considerably less than the diameter of said opening, a non-rotatable sleeve of substantial length encompassing the said shaft, one end of the sleeve extending into and adapted to pass through said opening, a resilient sealing annular member the body of which is normally substantially round in cross-section, and being positioned between said sleeve and the wall of said opening, and disposed within the plane of the faces of said wall, said element being seated in a recess in said opening wall and compressed between the bottom of said recess and said sleeve, a resilient sealing element spaced from the wall of the casing and abutting a shoulder on said shaft, a bearing element abutting the last said resilient element, and with which bearing element one end of the sleeve has running engagement, and resilient means for maintaining the said end of the sleeve in contact with said bearing element, the said excess in the wall of said opening being arc-shaped, the maximum chord of the said arc being slightly greater than the diameter of the body of said annular sealing member and operating to cause the latter to be further compressed as it is moved axially in the recess by the sleeve moving longitudinally through said opening.

4. In association with a housing member having a shaft extending through an opening in the wall thereof and rotatable with respect to said wall, the combination with a sealing organization embodying a bearing member rotatably mounted with and sealed at one end to the shaft, the seal embodying a resilient sealing element encompassing and frictionally secured to the shaft and disposed against a shoulder on the shaft, one face of the bearing member abutting said element, a non-rotatable sleeve of substantial length encompassing said shaft, the said opening being considerably larger than the external diameter of the adjacent portion of the sleeve, one end of said sleeve having running engagement with said bearing member, the other end of said sleeve passing freely through said opening, there being an open recess in the wall of said opening, a resilient annular sealing element encompassing said sleeve and seated in said recess and disposed within the plane of the faces of said wall, and through which last said sealing element said sleeve is adapted to slide, the depth of said recess being less than the normal cross-sectional diameter of the last said sealing element, whereby the latter will be compressed between the bottom of said recess and said sleeve, the said recess varying in depth from a medial point towards the ends thereof to further compress the sealing element as it is moved axially in said recess, and resilient means disposed between a shoulder on said sleeve and a stationary abutment for maintaining one end of said sleeve in running engagement with said bearing member.

ARVID E. KARLBERG.